United States Patent
Thommana et al.

(10) Patent No.: US 9,942,817 B1
(45) Date of Patent: Apr. 10, 2018

(54) MOBILE USER SYSTEM BEAM AND SATELLITE HANDOFF

(71) Applicant: Rockwell Collins, Inc., Cedar Rapids, IA (US)

(72) Inventors: John Thommana, Cedar Rapids, IA (US); Vincent F. Vella, Marion, IA (US); Bradley J. Koehler, Chaska, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/448,259

(22) Filed: Mar. 2, 2017

(51) Int. Cl.
*H04W 36/00* (2009.01)
*H04W 36/18* (2009.01)
*H04B 7/185* (2006.01)
*H04W 36/30* (2009.01)

(52) U.S. Cl.
CPC ........ *H04W 36/18* (2013.01); *H04B 7/18513* (2013.01); *H04W 36/30* (2013.01)

(58) Field of Classification Search
USPC ............... 455/3.02, 427–452.2, 7, 11.1, 12.1
See application file for complete search history.

(56) References Cited

U.S. PATENT DOCUMENTS

| | | | | |
|---|---|---|---|---|
| 9,313,813 | B2* | 4/2016 | Firoiu | H04W 16/18 |
| 2001/0007552 | A1* | 7/2001 | Schiff | H04B 7/18541 |
| | | | | 370/331 |
| 2007/0087690 | A1* | 4/2007 | Karabinis | H04B 7/18515 |
| | | | | 455/12.1 |
| 2017/0105153 | A1* | 4/2017 | Ashrafi | H04B 17/336 |
| 2017/0223735 | A1* | 8/2017 | Damnjanovic | H04W 74/08 |
| 2017/0230104 | A1* | 8/2017 | Purkayastha | H04B 7/18541 |
| 2017/0238216 | A1* | 8/2017 | Damnjanovic | H04B 17/309 |
| | | | | 455/427 |

* cited by examiner

*Primary Examiner* — Fayyaz Alam
(74) *Attorney, Agent, or Firm* — Angel N. Gerdzhikov; Donna P. Suchy; Daniel M. Barbieri

(57) ABSTRACT

Radios configured to operate in a satellite-based mobile user system and methods configured to support seamless beam and satellite handoff of such radios are disclosed. A radio may include a receiver, a transmitter, and one or more receiver-exciter in communication with the receiver and the transmitter. The receiver-exciter may include a bi-directional path configured to support radio communications and a receive-only path configured to receive signals on all frequencies utilized by a mobile user system. The radio may further include one or more waveform processor in communication with the receiver-exciter. The waveform processor may be configured to: digitize signals received on all frequencies utilized by the mobile user system; separate the signals into multiple channels; estimate quality measurements for the multiple channels; select a channel from the multiple channels based on the quality measurements; and establish a connection with the mobile user system using the selected channel.

20 Claims, 9 Drawing Sheets

MOBILE USER SYSTEM BEAM AND SATELLITE HANDOFF

BACKGROUND

Mobile user systems such as the Mobile User Objective System (MUOS) and the like are configured to provide worldwide, multi-service communications capabilities to newer, smaller terminals. Recent studies, however, concluded that MUOS is not operationally effective in providing reliable worldwide Wideband Code Division Multiple Access (WCDMA) communications to tactical users. One of the reasons for this conclusion is that MUOS does not provide the capability for a transparent transfer of communication services as a user transitions between satellite coverage areas and between satellite beams. MUOS breaks the connection between users when the system determines a transition to a new cell is needed, and then reconnects the users. It is noted that this handoff process creates a complete loss of communications.

SUMMARY

In one aspect, embodiments of the inventive concepts disclosed herein are directed to a radio. The radio may include a receiver, a transmitter, and at least one receiver-exciter in communication with the receiver and the transmitter. The at least one receiver-exciter may include a bi-directional path configured to support radio communications and a receive-only path configured to receive signals on all frequencies utilized by a mobile user system. The radio may further include at least one waveform processor in communication with the at least one receiver-exciter. The at least one waveform processor may be configured to: digitize signals received on all frequencies utilized by the mobile user system; separate the signals into a plurality of channels; estimate quality measurements for the plurality of channels; select a channel from the plurality of channels based on the quality measurements; and establish a connection with the mobile user system using the selected channel.

In a further aspect, embodiments of the inventive concepts disclosed herein are directed to a satellite based mobile user system terminal. The satellite based mobile user system terminal may include a receiver, a transmitter, and at least one receiver-exciter in communication with the receiver and the transmitter. The at least one receiver-exciter may include a bi-directional path configured to support radio communications with at least one satellite of the satellite based mobile user system and a receive-only path configured to receive signals on all frequencies utilized by the satellite based mobile user system. The satellite based mobile user system terminal may further include at least one waveform processor in communication with the at least one receiver-exciter. The at least one waveform processor may be configured to: digitize signals received on all frequencies utilized by the satellite based mobile user system; separate the signals into a plurality of channels; estimate quality measurements for the plurality of channels; select a channel from the plurality of channels based on the quality measurements; and establish a connection with the satellite based mobile user system using the selected channel.

In another aspect, embodiments of the inventive concepts disclosed herein are directed to a method. The method may include: providing a bi-directional path to support radio communications with a mobile user system; providing a receive-only path to receive signals on all frequencies utilized by the mobile user system; digitizing signals received on all frequencies utilized by the mobile user system; separating the signals into a plurality of channels; estimating quality measurements for the plurality of channels; selecting a channel from the plurality of channels based on the quality measurements; and establishing a connection with the mobile user system using the selected channel.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
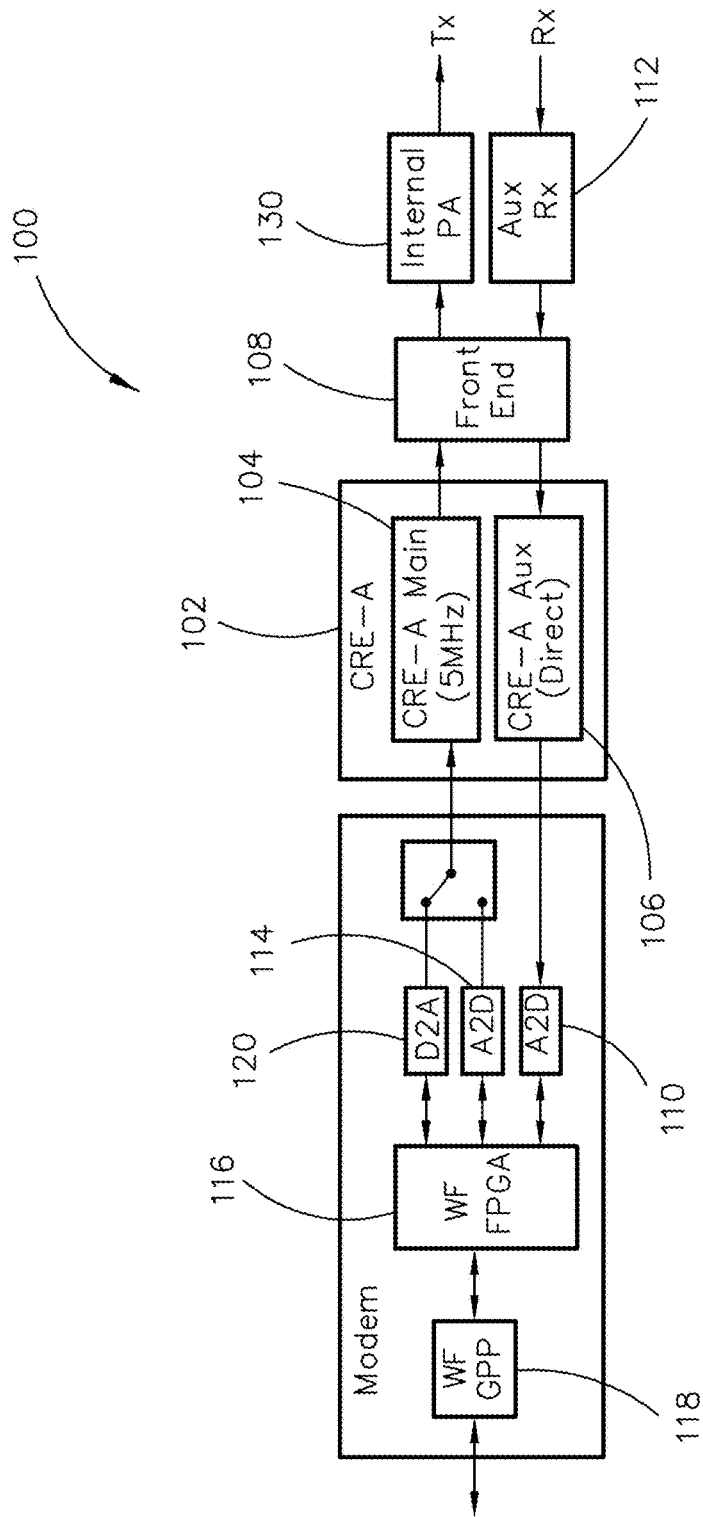
FIG. 1 is a block diagram depicting an exemplary radio (may also be referred to as a terminal) configured according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments of the inventive concepts disclosed herein are directed to radios configured to operate in a satellite-based mobile user system and methods configured to support seamless beam and satellite handoff of such radios. For purposes of simplicity and clarity, an exemplary ultra high frequency satellite communication system commonly referred to as the Mobile User Objective System (MUOS) will be referenced in the various examples described below. It is to be understood that the references to the MUOS are merely exemplary and are not meant to be limiting. It is contemplated that radios and methods configured in accordance with embodiments of the inventive concepts disclosed herein may be utilized in various other types of satellite-based mobile user systems without departing from the broad scope of the inventive concepts disclosed herein.

It is noted that because the base stations in satellite-based mobile user systems are positioned miles above ground, they typically use very high transmit power and different base stations typically use different frequencies to create separation. A typical terminal device (e.g., a MUOS radio) is configured to listen to one frequency at a time. As the terminal device moves away from a first satellite beam region towards a second satellite beam region, the terminal device has to break its connection with the first satellite beam region, search for the next best channel that can be used, and establish a new connection with the second satellite beam region. This process may be referred to as "break before make," and it results in loss of communication that may last for several minutes.

Radios configured in accordance with embodiments of the inventive concepts disclosed herein are configured with abilities to listen to more than one frequency at a time, allowing the radios to implement a "make before break" hand off process that can avoid loss of communication. Referring generally to FIG. 1, a block diagram depicting an exemplary radio 100 configured in accordance with an embodiment of the inventive concepts disclosed herein is shown. The radio 100 may include a single receiver-exciter (denoted as CRE-A) 102 configured to support two paths 104 and 106. More specifically, path 104 (together with analog-to-digital converter (A2D) 114 and digital-to-analog converter (D2A) 120) may be configured to function as a bi-directional path that can support narrowband and wideband (e.g., 1.2 MHz, 5 MHz, and 32 MHz) communications. Path 106, on the other hand, may be configured as a receive-only path. The path 106 may be configured to receive signals within a particular band (e.g., receives signals within a 5 MHz band within the 360-380 MHz range, thus allowing the path 106 to receive any one of the four channels in the 360-380 MHz range). Alternatively, the path 106 may operate as a direct path with no filters. The direct path can feed the full bandwidth (which includes multiple channels) received from the analog front end 108 to the A2D 110 for digital processing.

During normal operations, path 104 of CRE-A 102 may be configured to transmit using a 5 MHz channel bandwidth. Path 104 of CRE-A 102 may be communicatively connected to a transmitter, which may utilize a power amplifier 130 to facilitate the transmission. Path 106 of CRE-A 106 may be configured to receive using direct path to support full duplex communication. More specifically, the input to the auxiliary receiver 112 may come from a multiplexer (not shown), which may have already filtered out everything with the exception of the MUOS receive band (e.g., 340-380 MHz). The input may be provided to the front end 108, which then sends the receive band to path 106 of CRE-A 106. Path 106 may subsequently send the receive band to the A2D 110 to be processed for waveform reception.

It is noted that even though the entire 40 MHz receive band (360-380 MHz plus the extended receive band 340-360 MHz) is sent to the A2D 110, the system may be able to process only 6 out of the 8 MUOS channels due to aliasing. If aliasing is a problem, additional filters (e.g., added to the multiplexer or implemented as a bump in the wire) may be utilized to further limit the bandwidth to be less than or equal to 32 MHz. It is noted that because MUOS will be deployed with only 4 channels (within the 360-380 MHz band) initially, having the abilities to process 6 MUOS channels may be sufficient. It is also contemplated that by selecting a sampling rate greater than 200 MHz and using intermediate frequency (IF) filters that pass 40 MHz can ensure that next generation radios can overcome the aliasing issue and process all 8 MUOS channels and/or 40 MHz waveforms.

Figure 2:
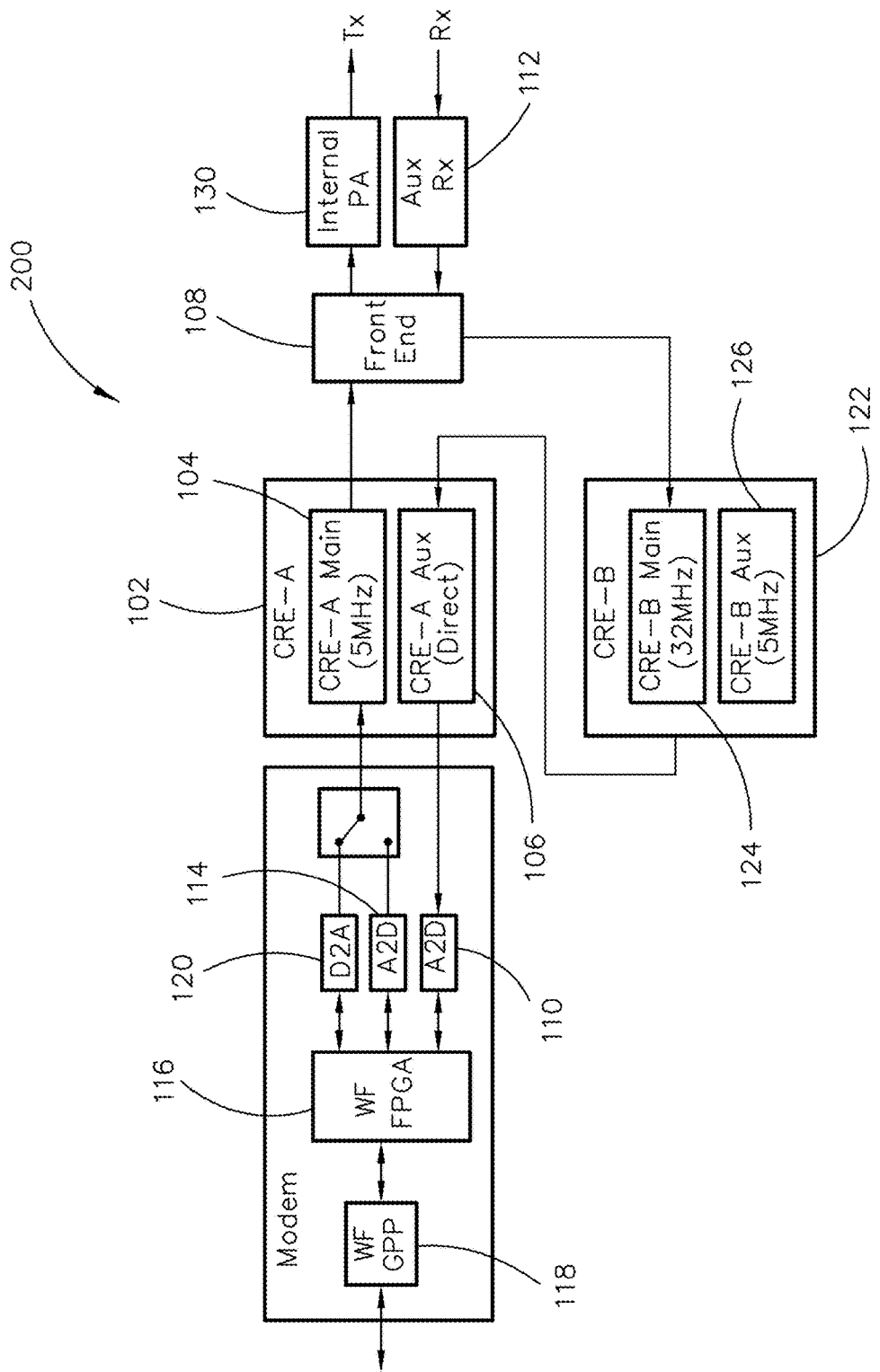
FIG. 2 is a block diagram depicting an exemplary radio configured according to an exemplary embodiment of the inventive concepts disclosed herein.

FIG. 2 is a block diagram depicting an exemplary radio 200 configured in accordance with an embodiment of the inventive concepts disclosed herein. The configuration of the radio 200 is similar to that of the radio 100, except for that the radio 200 may include two receiver-exciters (denoted as CRE-A 102 and CRE-B 122). As shown in FIG. 2, both CRE-A 102 and CRE-B 122 may include two paths, path 104 and path 106 for CRE-A 102, and path 124 and path 126 for CRE-B 122, respectively. Path 104 of CRE-A 102 may be configured to transmit using a 5 MHz channel bandwidth and path 124 of CRE-B 122 may be configured to receive and support full duplex communication. The input to the auxiliary receiver 112 may come from a multiplexer (not shown), which may have already filtered out everything with the exception of the MUOS receive band (e.g., 340-380 MHz). The input may be provided to the front end 108, which then sends the receive band to path 124 of CRE-B 122. It is noted that path 124 of CRE-B 122 may serve effectively as an additional filter to help further reduce noises outside of the MUOS receive band. The output of path 124 of CRE-B 122 may then be fed to path 106 of CRE-A 106, which may be configured to operate as described above.

It is noted that CRE-A 102 and CRE-B 122 may be implemented using the same hardware, which may help reduce manufacturing cost. However, it is also noted that path 126 of CRE-B 122 is not fully utilized in the configuration depicted in FIG. 2. A modified radio 300 depicted in FIG. 3 addresses this concern.

Figure 3:
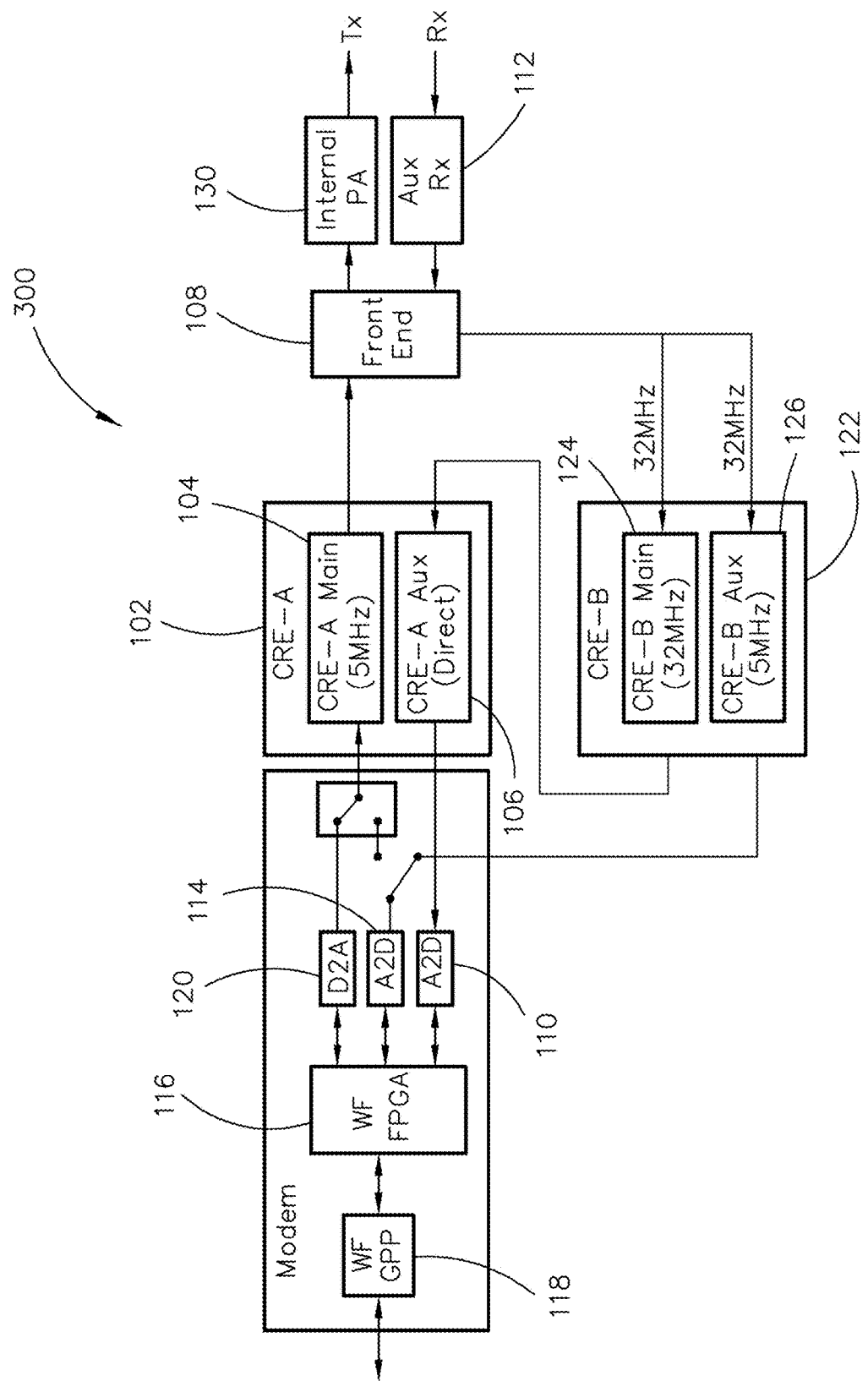
FIG. 3 is a block diagram depicting an exemplary radio configured according to an exemplary embodiment of the inventive concepts disclosed herein.

As shown in FIG. 3, one or more filters may be provided to the front end 108 to limit the bandwidth sent to CRE-B 122. The filtered band may then be provided to CRE-B 122, where path 124 of CRE-B 122 may be configured to help further reduce noises outside of the MUOS receive band before feeding the filtered band to path 106 of CRE-A 106, which may be configured to operate as described above. Path 126 of CRE-B 122 may be configured to receive signals within a particular band (e.g., receives signals within a 5 MHz band out of the 32 MHz band) and provide that particular band (which corresponds to a particular channel) to the A2D 114 to be processed for waveform reception.

It is to be understood that the references made to 5 MHz channels and 32 MHz frequency bands are merely exemplary and are not meant to be limiting. It is also to be understood that radios 100, 200, and 300 described above are merely exemplary. It is contemplated that modifications may be made to radios 100, 200, and 300 described above without departing from the broad scope of the inventive concepts disclosed herein. It is to be understood that an objective of configuring radios 100, 200, and 300 in the manner described above is to provide the radios 100, 200, and 300 abilities to continue listening to one base station (or one channel) while negotiating with another base station (or another channel), allowing the radios to establish new connections before breaking existing connections and effectively providing seamless handoff processes. This ability is realized by allowing the radios 100, 200, and 300 to receive signals on all MUOS frequencies and use the A2D 110 to digitize the received signals before they are filtered out (e.g., separated or split) into independent channels by the waveform field-programmable gate array (FPGA) 116 or one or more general purpose processors (GPPs) 118. The independent channels may then be processed in parallel, serial, or a combination thereof.

Figure 4:
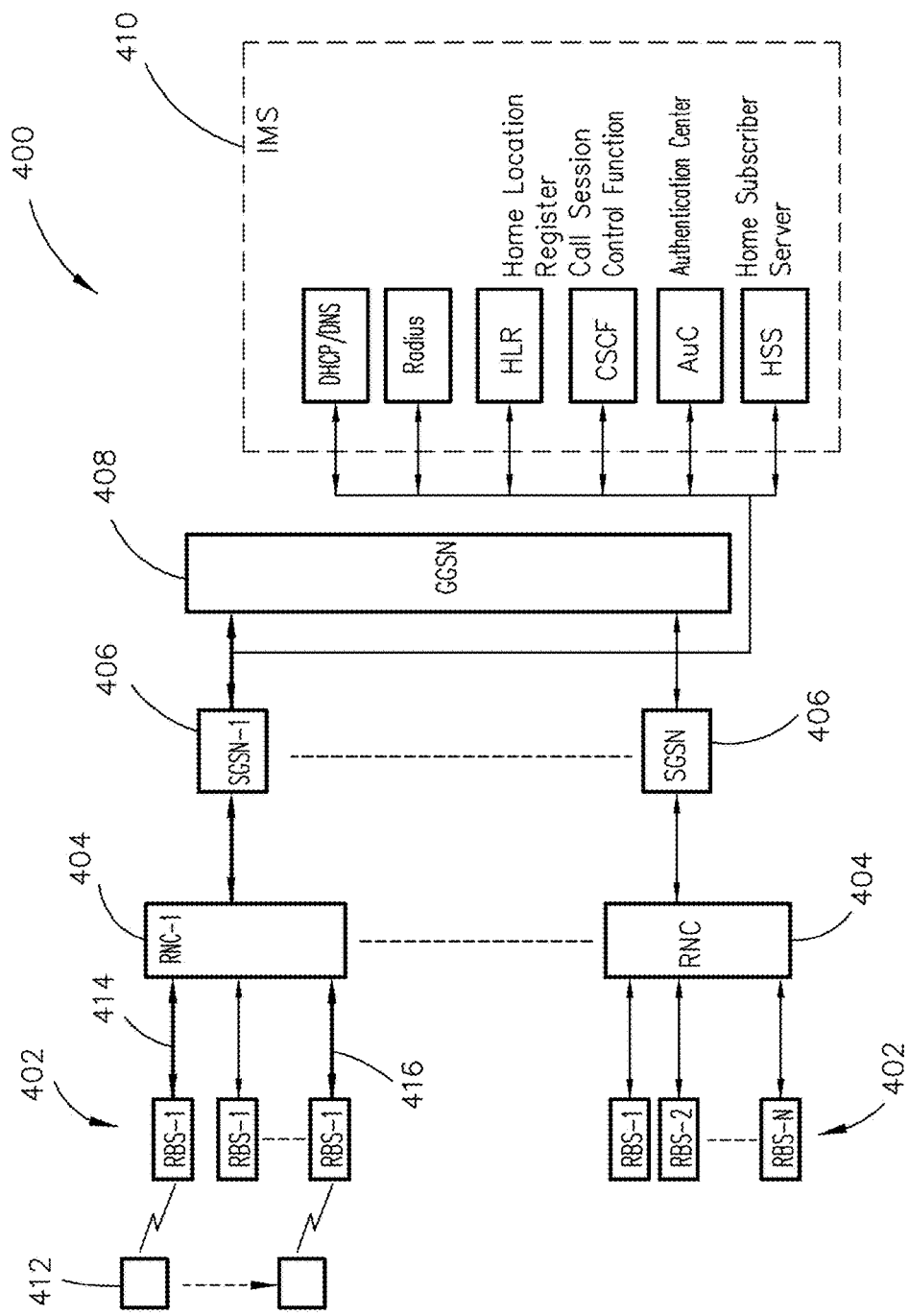
FIG. 4 is a block diagram depicting a mobile user systems handling a handoff process according to an exemplary embodiment of the inventive concepts disclosed herein.

It is noted that while the radios 100, 200, and 300 described above are now equipped with abilities to support seamless handoff processes, the MUOS system (of which the radios 100, 200, and 300 are terminal nodes) is required to provide support for it as well. Propitiously, the current MUOS system is already capable of supporting the aforementioned changes to the radios. FIG. 4 is a simplified block diagram depicting a MUOS system 400. Each satellite participating in the MUOS system 400 may be configured to support a number of spot beams (e.g., 16 spot beams). Each spot beam may have a number of frequencies (e.g., 4 frequencies) each handled by a single Radio Base Station (RBS) 402. Multiple RBSs 402 may be handled by a single Radio Network Controller (RNC) 404; multiple RNCs 404 may be serviced by a single Serving GPRS Support Node (SGSN) 406; and multiple SGSNs 406 may be serviced by a single Gateway GPRS Support Node (GGSN) 408. The MUOS system 400 may also include additional components generally referred to as IP Multimedia Subsystem (IMS) 410, which are utilized to support packet networking. It is noted that because the components utilized to form the MUOS system 400 are well understood by those skilled in the art, detailed explanations of these components are not repeated in the present disclosure.

Also depicted in FIG. 4 is a handoff process of a radio 412. It is noted that when the radio 412 is locked on to a frequency, it gets associated with the RBS (e.g., RBS-1) that handles that particular frequency as well as the RNC (e.g., RNC-1), the SGSN (e.g., SGSN-1), and the GGSN along the path 414. As the radio 412 moves away from RBS-1 and starts to negotiate with RBS-N handled by the same RNC-1, for example, a local handoff situation is created, which can be handled easily because RNC-1 already has the control information needed. Therefore, as long as the radio 412 has the ability to communicate over multiple frequencies to establish a connection with RBS-N before break off its connection with RBS-1, a seamless handoff can be achieved in this local handoff situation.

Figure 5:
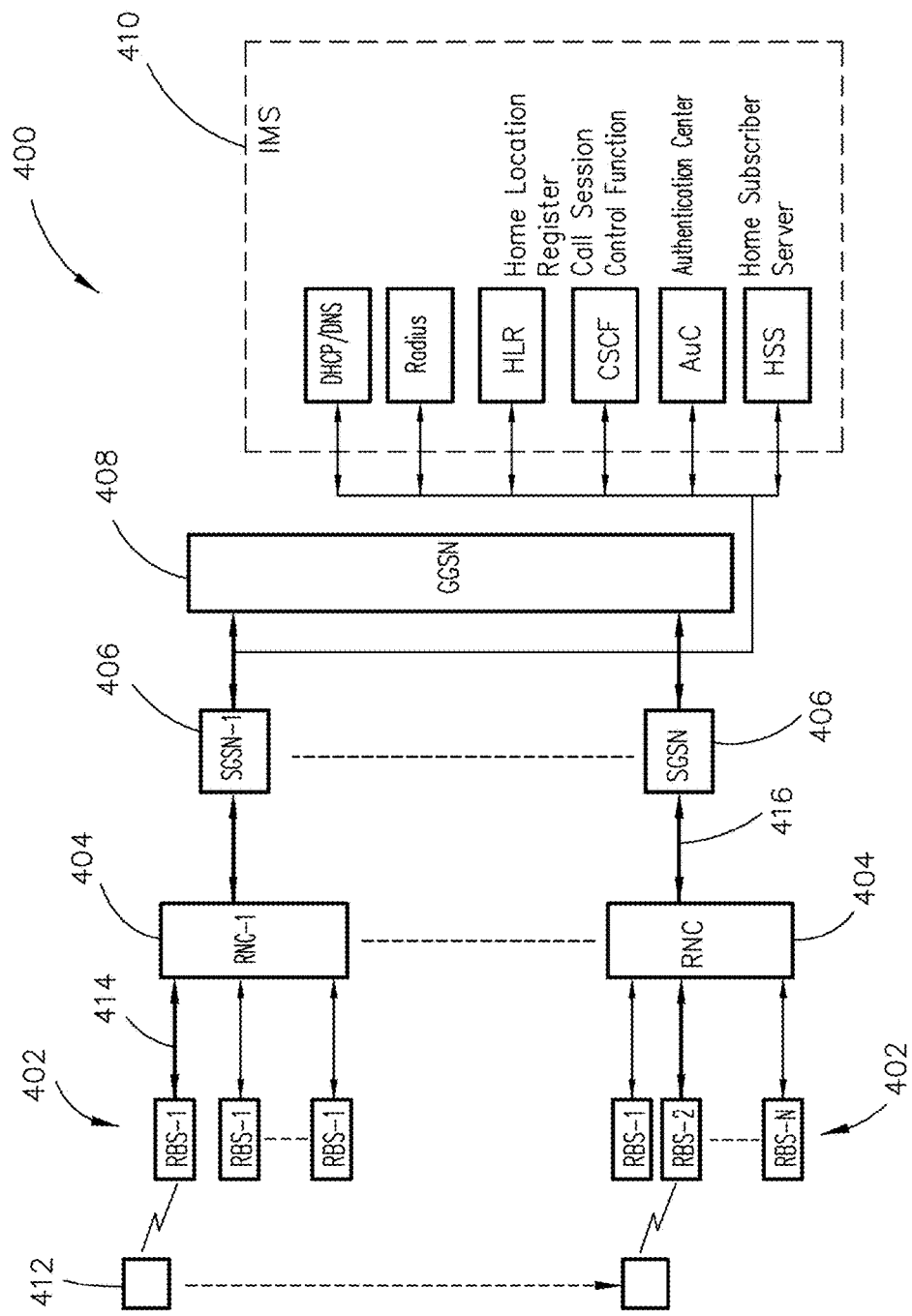
FIG. 5 is a block diagram depicting a mobile user systems handling a handoff process according to an exemplary embodiment of the inventive concepts disclosed herein.

FIG. 5 depicts a handoff process that crosses RNCs. Suppose the radio 412 is moving away from RBS-1 handled by RNC-1 and wants to establish a new connection with RBS-2 handled by another RNC (e.g., RNC-M). It is noted that this handoff process may require some additional backend support (e.g., the backend will need to send signals to via both paths 414 and 418 during the handoff process), but this backend support can be provided without any structural/architectural changes to the MUOS system 400 because the components involved are already networked. It is therefore contemplated that as long as the radio 412 has the ability to communicate over multiple frequencies, a seamless handoff can be achieved when the radio crosses RNCs (or even SGSNs) by coordinating the routing within the MUOS system 400.

It has already been shown that radios 100, 200, and 300 described above have the abilities to communicate over multiple frequencies. In other words, radios 100, 200, and 300 described above can be utilized in a MUOS system 400 and achieve seamless handoff both locally and across RNCs. It is noted, however, there may still be some additional system-level requirement that needs to be satisfied. For instance, the radios 100, 200, and 300 may be required to have parallel multi-channel estimation capabilities to help support seamless handoff. More specifically, a radio configured in accordance with embodiments of the inventive concepts disclosed herein may have to be able to receive the common pilot channel (CPICH) transmitted by every RBS. The radio may then use the CPICH for channel estimation, load balancing, and making measurements needed for handover and base station selection/reselection.

It is noted that radios configured in accordance with embodiments of the inventive concepts disclosed herein do have the abilities to receive the CPICH transmitted by every RBS. More specifically, since radios configured in accordance with embodiments of the inventive concepts disclosed herein can receive signals on all MUOS frequencies, multiple channels are visible to the radios, and these radios can indeed perform simultaneous channel estimation of all visible channels.

For instance, the radio may use quality measurements, such as the Ec/No measurement, of each RBS to determine the best channel to operate on. The Ec/No measurement may be calculated as the received signal code power divided by the total received power (which is equivalent to the received signal strength indicator). Once the best channel is determined, the radio may transition to traditional MUOS processing that permits the radio to log on to the MUOS network and become operational.

Once the radio becomes operational, the radio resource control layer of the radio may be connected to the radio resource control layer of the RNC that the radio is connected to. The RNC may also initiate measurement procedures and periodically send out a measurement control message to the radio and prompt the radio to perform Ec/No measurements of all RBS visible and report back to the RNC. Another technique that the RNC can employ is that it can initiate a periodic reporting cycle where the radio will report Ec/No measurements to the RNC at every specified interval. These periodic measurements of Ec/No can be used by the RNC to determine whether a handoff to a neighboring RBS/RNC is required to maintain the link. It is to be understood that because Ec/No measurement techniques are well understood by those skilled in the art, detailed explanations of these techniques are not repeated in the present disclosure.

Figure 6:
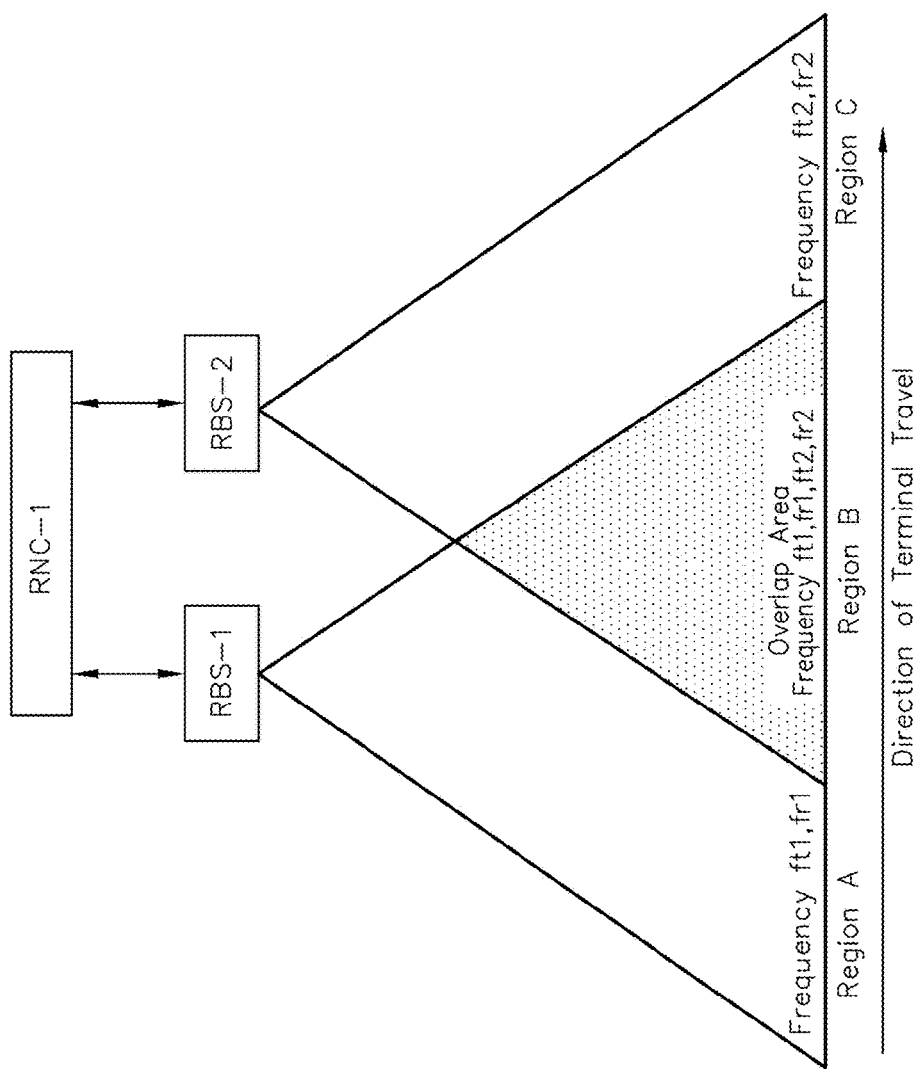
FIG. 6 is an illustration depicting handoff of a radio.

Referring now to FIG. 6, an illustration depicting a simple handoff scenario is shown. For illustrative purposes, frequencies ft1 and fr1 are utilized to indicate uplink and downlink frequencies assigned to RBS-1 and frequencies ft2 and fr2 are utilized to indicate uplink and downlink frequencies assigned to RBS-2, respectively.

With reference to FIG. 6, once a radio (indicated as "Terminal T") moves from Region A into Region B, the radio will start noticing that frequency fr1 is deteriorating. The radio may therefore start to prepare for a handoff. For illustrative purposes, a simplified flow diagram describing a traditional "break before make" handoff process 700 is presented in FIG. 7.

Figure 7:
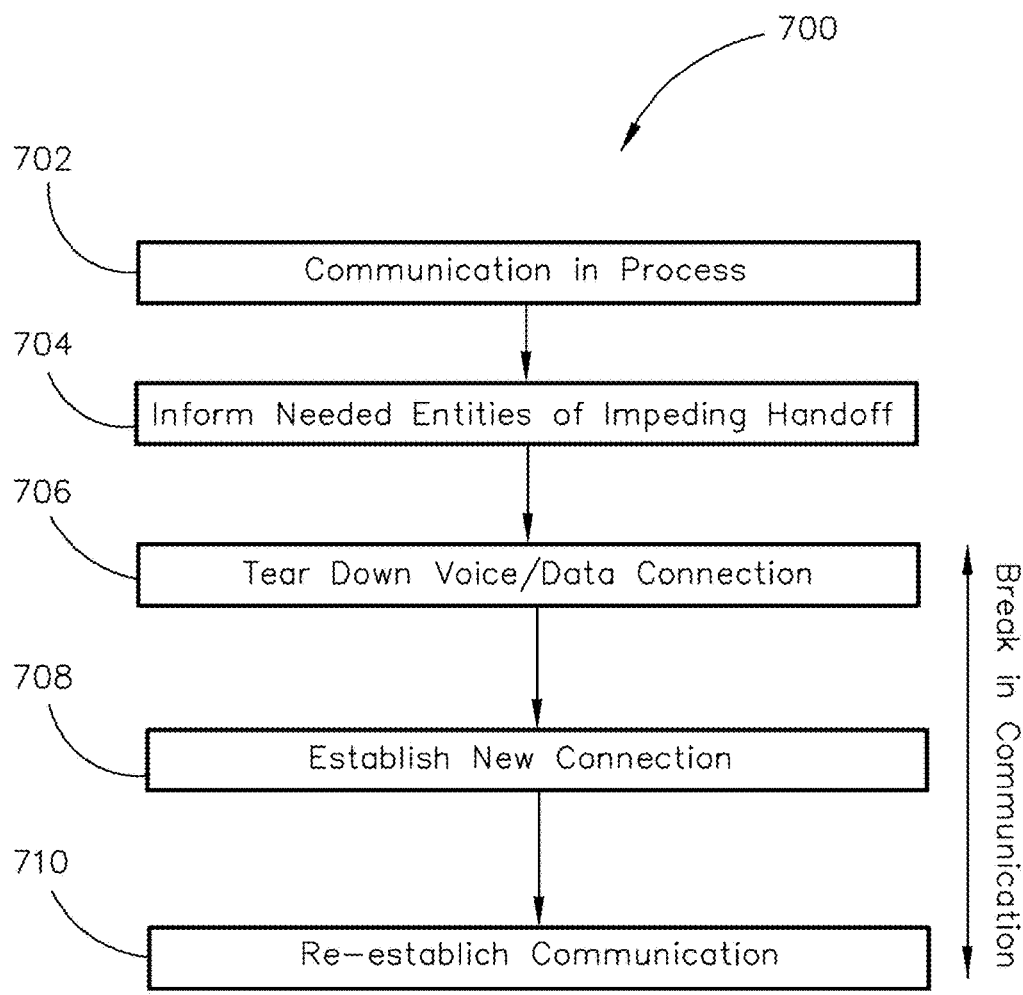
FIG. 7 is a flow diagram depicting a conventional handoff process.

As FIG. 7 shows, in a traditional "break before make" handoff process, the radio currently in communication with RBS-1 (step 702) will first inform the various entities involved of the impending handoff (step 704). For instance, the radio may send a "SIP Mobility Event Pending" message to inform all participants that its connectivity is degrading and it has to perform a handoff soon. The radio may then wait for an acknowledgement from the network that all participants have been informed of the mobility event. The radio may then send a "SIP Mobility Event Indicator" message to inform all participants that it is initiating a handoff. Upon receiving an acknowledgement from the network, the radio may start handoff processing.

The radio may start handoff processing by tearing down its voice/data connections (step 706). For instance, the radio may deactivate all bearer PDP contexts that have been established with RNC-1. RNC-1 may then send a "Radio Bearer Release" message to the radio, which may then acknowledge by sending a "Radio Bearer Release Complete" message to RNC-1. RNC-1 may then send a "Radio Link Deletion Request" to RBS-1, which may respond with a "Radio Link Deletion Response" to RNC-1 after releasing all resources. The radio may now perform a search to find a new base station to establish connection and detects frequency fr2 and potentially other frequencies and informs RNC-1 using control channels. Once the search is complete, the radio can send a "MUOS Acquisition Mobility Assistance Request" to RNC-1 through RBS-1 control channel on ft1. At this point, the radio is still in communication with the original RNC-1, and RNC-1 will respond back with a "MUOS Acquisition Mobility Assistance Response" and ask the radio to use frequency pair ft2, fr2.

The radio may now start establishing connection with RNC-1 via RBS-2 (step 708). For example, the radio may send a "Cell Update" to RNC-1 to inform the network that it can now be reached via RBS-2. RNC-1 may acknowledge with a "Cell Update Confirm". The radio may then send an "Activate PDP Context Request" to RNC-1 and start allocating resources for the new connection with all concerned parties. RNC-1 may send a "Radio Link Setup Request" to RBS-2 to allocate the required resources to communicate with the radio and respond with a "Radio Link Setup Response". After allocating the required resources, RBS-2 may reply with a "Radio Link Restore Indication" to RNC-1 to confirm resource allocation. RNC-1 may then send "Radio Bearer Setup Request" to the radio, which may respond with a "Radio Bearer Setup Complete" to RNC-1. RNC-1 may respond with an "Activate PDP Context Accept" to acknowledge that the previous PDP context request sent by the radio is completed. The radio may then send a message to the MUOS network to establish a session by sending a "SIP Invite with Replace". The MUOS network may respond with a "SIP Trying" message and start to set up the required network resources. Upon completion, the MUOS network may respond with a "SIP Bye" message to the radio indicating availability of network resources. The radio may send a "SIP End of Mobility Event Indicator" informing everyone involved that the handoff process is complete and the radio is now available for communication (step 710). The network responds with "SIP OK" confirming end of mobility event.

The process illustrated above shows that once the radio tears down its voice/data connections in step 706, the radio loses its communication until it re-establishes communication again in step 710. As mentioned previously, this loss of communication may last for several minutes.

Figure 8:
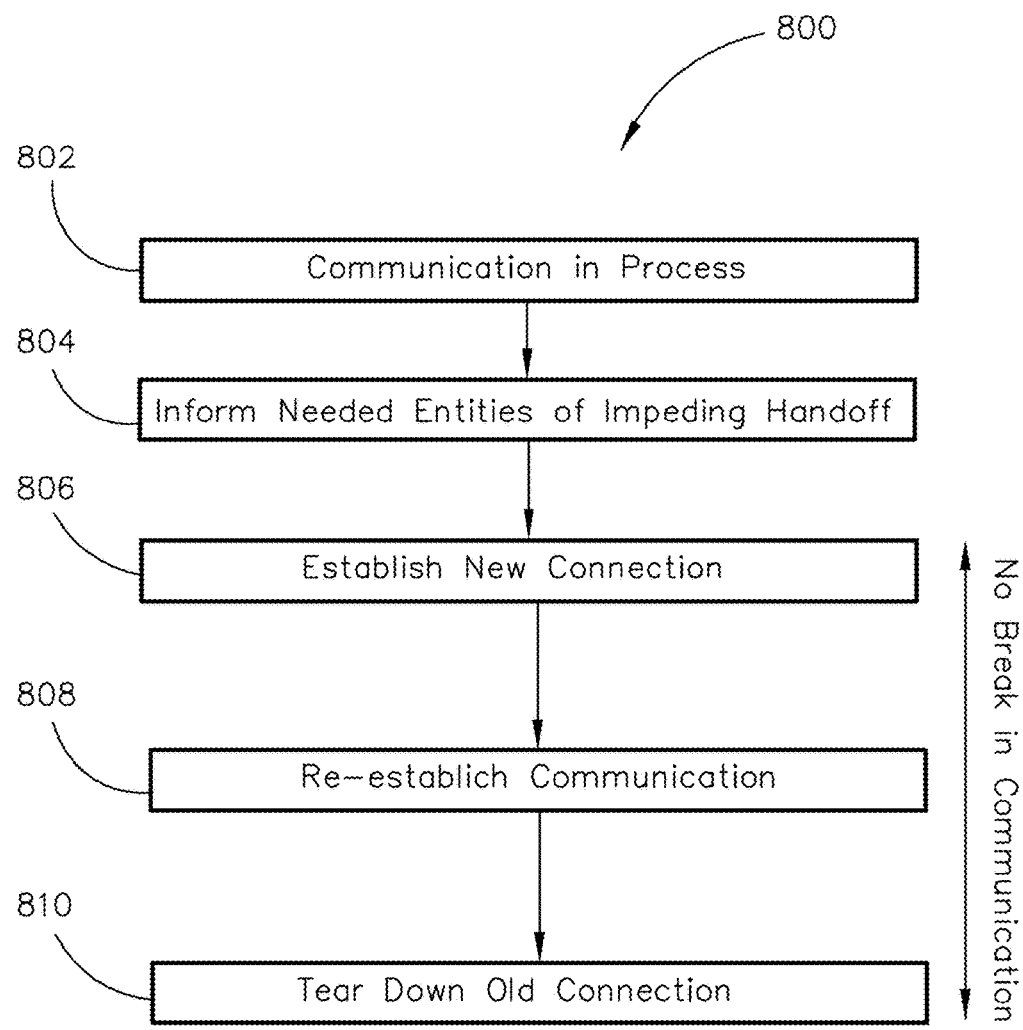
FIG. 8 is a flow diagram depicting a seamless handoff process according to an exemplary embodiment of the inventive concepts disclosed herein.

FIG. 8 is a simplified flow diagram descripting a "make before break" handoff process 800 supported utilizing a radio configured in accordance with the inventive concepts disclosed herein. It is noted that the radio has the ability to estimate the signal strengths of all visible beams at all times. Once the radio enters Region B (with reference to FIG. 6), the radio can detect the presence of frequency fr2. Initially, fr2 may be much weaker than fr1 but as the radio moves into Region B, fr2 will become stronger and fr1 will become weaker. Once fr2 increases beyond a specific threshold, the radio will determine that fr2 is a candidate for handoff and periodically tracks the Ec/No of that channel. As the terminal moves further in to Region B, the radio may start to notice that frequency fr1 is deteriorating and the radio may start preparing for a handoff.

As FIG. 8 shows, in a "make before break" handoff process, the radio currently in communication with RBS-1 (step 802) will inform the various entities involved of the impending handoff (step 804). For instance, the radio may send a "SIP Mobility Event Pending" Message to inform all participants that its connectivity is degrading and it has to perform a handoff soon. The radio may then wait for an acknowledgement from the network that all participants have been informed of the mobility event. The radio may then send a "SIP Mobility Event Indicator" message to inform all participants that it is initiating a handoff. Upon receiving an acknowledgement from the network, the radio may start handoff processing. It is noted that the original connection through RBS-1 is still active during this period.

The radio may start handoff processing by establishing a new connection (step 806). For instance, the radio may send a "MUOS Acquisition Mobility Assistance Request" to RNC-1 through RBS-1. RNC-1 may respond back with "MUOS Acquisition Mobility Assistance Response" asking the radio to use frequency pair ft2, fr2. Now the frequency pair ft2, fr2 can be associated with a different RBS connected to: 1) the same RNC on the same satellite, 2) a different RBS connected to a different RNC on the same satellite, or 3) a different RBS connected to a different RNC on a different satellite (depending on the movement of the radio). This is agnostic to the terminal and can be handled by the MUOS infrastructure (as previously mentioned).

Subsequently, the radio may lock on RBS-2 and start establishing connection with RNC-1. The radio may then send an "Activate PDP Context Request" to RNC-1 via RBS-2 and start allocating resources for the new connection with all concerned parties. RNC-1 may then send a "Radio Link Setup Request" to RBS-2 to allocate the required resources to communicate with T and responds with "Radio Link Setup Response". After allocating the required resources, RBS-2 may reply with a "Radio Link Restore Indication" to RNC-1 to confirm resource allocation. RNC-1 may then send a "Radio Bearer Setup Request" to the radio via ft2. The radio may respond with "Radio Bearer Setup Complete" to RNC-1 via fr2. RNC-1 may then respond with an "Activate PDP Context Accept" to acknowledge that the previous PDP context request sent by the radio is completed. At this point, the radio can communicate with RNC-1 via RBS-1 and RBS-2. From now on RNC-1 will send information to the radio via RBS-1 and RBS-2.

The radio may then start to re-establish communication through the new connection (step 808). For instance, the radio may send a message to the MUOS network via RBS-2 to establish a session by sending "SIP Invite with Replace". The MUOS network may respond via RBS-2 with a "SIP Trying" and starts setting up the required network resources. Upon completion, the MUOS network may respond with a "SIP Bye" message to the radio indicating availability of network resources.

The radio may now start deactivating all bearer PDP context established with RNC-1 via RBS-1 (step 810). RNC-1 may then send a "Radio Bearer Release" message to T via RBS-1. The radio may acknowledge by sending a "Radio Bearer Release Complete" to RNC-1 via RBS-1. RNC-1 may send a "Radio Link Deletion Request" to RBS-1. RBS-1 may respond with a "Radio Link Deletion Response" to RNC-1 after releasing all resources. The radio may then send a "SIP End of Mobility Event Indicator" informing everyone involved that the handoff process is complete and terminal T is now available for communication. The network may respond with "SIP OK" confirming end of mobility event.

It is noted that the process illustrated in FIG. 8 shows that the radio is able to maintains its communication (e.g., the radio is able to receive) throughout the entire handoff process. The problems associated with loss of communication in a traditional "break before make" handoff process can be effectively avoided.

It is also noted that the "make before break" handoff process depicted in FIG. 8 requires the radio to communicate via two RBSs with the MUOS network during the handoff process. Each of the radios 100, 200, and 300 shown in FIGS. 1, 2, and 3, however, has just a single transmitter path. It is contemplated that there are at least two options of sharing the single transmitter path. One option is to communicate to RBS-1 and RBS-2 using the 5 MHz IF filter path during transmit. Using this option may incur a tune time penalty during every switch. An alternative option is to communicate to RBS-1 and RBS-2 using the 32 MHz IF filter path during transmit. Using this option may avoid the analog tuning because the filter is wide enough to enable communication with multiple channels by digitally shifting the transmitter (e.g., using NCO offset) within the 32 MHz window. It is contemplated that these two options presented here are merely exemplary and are not meant to be limiting. It is to be understood that other options may be made available (including the option of using additional transmitters) without departing from the broad scope of the inventive concepts disclosed herein.

Figure 9:
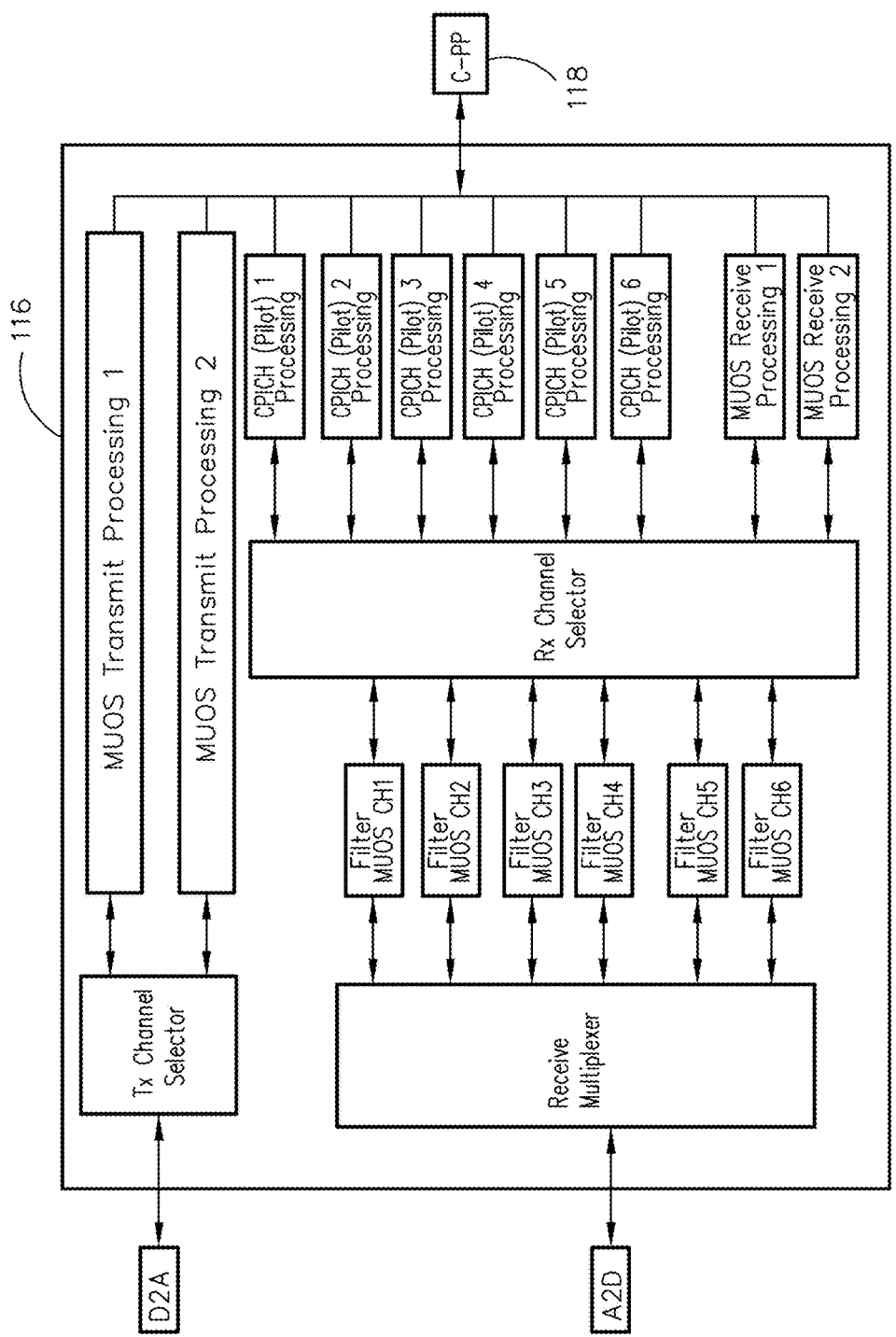
FIG. 9 is a block diagram depicting an exemplary implementation of a waveform field-programmable gate array according to an exemplary embodiment of the inventive concepts disclosed herein.

It is also to be understood that the abilities to communicate on two or more MUOS channels simultaneously may be limited by resources and transmit duty cycles of the FPGAs 116 utilized by the radios 100, 200, and 300. FIG. 9 is a simplified block diagram depicting an exemplary FPGA 116 that may be utilized to support operations of the radios 100, 200, and 300.

Although recent advances in FPGA technology have dramatically increased the ability to process high sample rate signals, it is still a challenge to perform multichannel signal processing without increasing FPGA resources several-fold. However, FPGA-based MUOS Rx channel filtering can be accomplished in multiple stages, at multiple (intermediate) sampling rates so that all high-clock rate clock processing can be kept relatively simple (and the need for duplication of FPGA resources kept at a minimum), while moving more complicated processing (e.g., longer FIR filters) to lower sampling rates, where FPGA resources can be time-division multiplexed (TDM), rather than parallelized. Within the waveform itself, detection of a CPICH channel utilizes about 30% of total MUOS waveform FPGA resources, including logic shared with other receiver functions. Although some of this would have to be duplicated to implement simultaneous multi-channel detection, due to the relatively low baseband sample rate, much of it could be accomplished in a TDM fashion, similar to the Rx frontend signal processing operations. On the uplink (Tx) side, processing resources within the waveform occupy about 18% of the total; however, given the relatively low processing rates, there is an opportunity for time division multiplexing to realize some savings. Finally, in the Tx frontend, as in the Rx frontend, multi-rate signal processing can be employed to keep resource utilizations within reasonable bounds.

As will be appreciated from the above, radios and methods configured in accordance with embodiments of the inventive concepts disclosed herein allows for seamless handoff processing without loss of communication. It may also be appreciated that because radios configured in accordance with embodiments of the inventive concepts disclosed herein can implement a software defined architecture, physical layer processing may be implemented independent from, and in parallel to, the rest of the MUOS waveform processing. Because the higher layer software components may be abstracted away from the other computer software configuration items they depend on, changes to the radio architecture may be made seamlessly with respect to the rest of the radio (both in terms of software and hardware), therefore providing additional flexibilities for controlling radios configured in accordance with embodiments of the inventive concepts disclosed herein.

It is contemplated that radios configured in accordance with embodiments of the inventive concepts disclosed herein may provide additional capabilities unsupported by typical terminal devices (radios) that are configured to listen to one frequency at a time. For instance, radios configured in accordance with embodiments of the inventive concepts disclosed herein may be permitted to participate in multiple call groups simultaneously (both active and emission). Radios configured in accordance with embodiments of the inventive concepts disclosed herein may also address one of the complaints about current MUOS waveform, which is the lack of the knowledge that a handoff is in progress. From the perspective of a user, all that is known currently is that connectivity is lost with certain individuals. This lack of knowledge can be addressed using a special beep followed by an optional audible message (e.g., "Handoff: User1, User2"). The message may also be indicated on a human machine interface and/or various other types of control interfaces. These indications can also define the type of handoff (e.g., traditional or seamless) so that the other participants know that if a seamless handoff is in progress then the user can receive everything going on and can transmit back at a slower rate as they have to share the transmitter.

Radios configured in accordance with embodiments of the inventive concepts disclosed herein may also support a more proactive rectification of potential connectivity issues. More specifically, since a radio configured in accordance with embodiments of the inventive concepts disclosed herein is able to track all visible MUOS downlinks, the radio can provide a proactive means to monitor beam carriers (e.g., SA-WCDMA or spectrally adaptive wideband code division multiple access beam carriers) to prevent extended outages for deployed users. It is contemplated that the beam carrier status can be queried from the local human machine interface or over the air, allowing the network to maintain an active map of network connectivity status. MUOS network managers may assess and report on SA-WCDMA satellite beam carrier availability by querying the terminal periodically. The MUOS network managers may send new configurations to the radio to rectify connectivity issues proactively rather than reactively.

It is contemplated that radios configured in accordance with embodiments of the inventive concepts disclosed herein may be install on various types of mobile platforms and/or vehicles, including land vehicles, watercraft (e.g., ships, boats), aircraft, and spacecraft.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A radio, comprising:
   a receiver;
   a transmitter;
   at least one receiver-exciter in communication with the receiver and the transmitter, the at least one receiver-exciter comprising:
      a bi-directional path configured to support radio communications through the transmitter; and
      a receive-only path configured to receive signals on all frequencies utilized by a mobile user system through the receiver; and
   at least one waveform processor in communication with the at least one receiver-exciter, the at least one waveform processor configured to:
      digitize signals received on all frequencies utilized by the mobile user system;
      separate the signals into a plurality of channels;
      estimate quality measurements for the plurality of channels;
      select a channel from the plurality of channels based on the quality measurements; and
      establish a connection with the mobile user system using the selected channel.

2. The radio of claim 1, wherein the radio is connected to the mobile user system through an existing channel, wherein the at least one waveform processor is further configured to:
   maintain the existing channel;
   establish a new connection with the mobile user system using the selected channel prior to deactivating the existing channel; and
   deactivate the existing channel after establishment of communication with the mobile user system using the new connection.

3. The radio of claim 2, wherein the radio is configured to indicate a progress of the establishment of the new connection.

4. The radio of claim 1, wherein the radio is connected to a satellite based mobile user system.

5. The radio of claim 1, wherein the quality measurements comprise an Ec/No measurement indicating a received signal code power divided by a total received power.

6. The radio of claim 1, wherein the at least one receiver-exciter comprises a first receiver-exciter and a second receiver-exciter, wherein the first receiver-exciter is utilized to filter the signals received on all frequencies utilized by the mobile user system and provide the filtered signals to the second receiver-exciter.

7. The radio of claim 6, wherein the first receiver-exciter is further configured to receive signals within a particular band and provide the signals within the particular band to the at least one waveform processor.

8. A satellite based mobile user system terminal, comprising:
   a receiver;
   a transmitter;
   at least one receiver-exciter in communication with the receiver and the transmitter, the at least one receiver-exciter comprising:
      a bi-directional path configured to support radio communications with at least one satellite of the satellite based mobile user system through the transmitter; and a receive-only path configured to receive signals on all frequencies utilized by the satellite based mobile user system through the receiver; and at least one waveform processor in communication with the at least one receiver-exciter, the at least one waveform processor configured to:
  digitize signals received on all frequencies utilized by the satellite based mobile user system;
  separate the signals into a plurality of channels;
  estimate quality measurements for the plurality of channels;
  select a channel from the plurality of channels based on the quality measurements; and
  establish a connection with the satellite based mobile user system using the selected channel.

9. The satellite based mobile user system terminal of claim 8, wherein the terminal is connected to the satellite based mobile user system through an existing channel, wherein the at least one waveform processor is further configured to:
  maintain the existing channel;
  establish a new connection with the satellite based mobile user system using the selected channel prior to deactivating the existing channel; and
  deactivate the existing channel after establishment of communication with the satellite based mobile user system using the new connection.

10. The satellite based mobile user system terminal of claim 9, wherein the terminal is configured to indicate a progress of the establishment of the new connection.

11. The satellite based mobile user system terminal of claim 8, wherein the quality measurements comprise an Ec/No measurement indicating a received signal code power divided by a total received power.

12. The satellite based mobile user system terminal of claim 8, wherein the at least one receiver-exciter comprises a first receiver-exciter and a second receiver-exciter, wherein the first receiver-exciter is utilized to filter the signals received on all frequencies utilized by the satellite based mobile user system and provide the filtered signals to the second receiver-exciter.

13. The satellite based mobile user system terminal of claim 8, wherein the first receiver-exciter is further configured to receive signals within a particular band and provide the signals within the particular band to the at least one waveform processor.

14. A method, comprising:
  providing a bi-directional path to support radio communications with a mobile user system through a transmitter;
  providing a receive-only path to receive signals on all frequencies utilized by the mobile user system through a receiver;
  digitizing signals received on all frequencies utilized by the mobile user system;
  separating the signals into a plurality of channels;
  estimating quality measurements for the plurality of channels;
  selecting a channel from the plurality of channels based on the quality measurements; and
  establishing a connection with the mobile user system using the selected channel.

15. The method of claim 14, further comprising:
  maintaining an existing connection with the mobile user system;
  establishing a new connection with the mobile user system using the selected channel prior to deactivating the existing connection; and
  deactivating the existing connection after establishment of communication with the mobile user system using the new connection.

16. The method of claim 15, further comprising:
  indicating a progress of the establishment of the new connection.

17. The method of claim 14, wherein the mobile user system is a satellite based mobile user system.

18. The method of claim 17, wherein the quality measurements comprise an Ec/No measurement indicating a received signal code power divided by a total received power.

19. The method of claim 17, further comprising:
  filtering the signals received on all frequencies utilized by the satellite based mobile user system prior to digitizing the signals.

20. The method of claim 17, wherein the satellite based mobile user system is an ultra high frequency satellite communication system.

* * * * *